US012609070B2

(12) United States Patent
Sohn et al.

(10) Patent No.: US 12,609,070 B2
(45) Date of Patent: Apr. 21, 2026

(54) ELECTRONIC DEVICE

(71) Applicant: Samsung Display Co., Ltd., Yongin-Si (KR)

(72) Inventors: Youngsoo Sohn, Yongin-si (KR); Seok Hwan Roh, Yongin-si (KR); Geunyoung Jeong, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/830,578

(22) Filed: Sep. 11, 2024

(65) Prior Publication Data

US 2025/0166553 A1 May 22, 2025

(30) Foreign Application Priority Data

Nov. 22, 2023 (KR) ........................ 10-2023-0163274

(51) Int. Cl.
*G09G 3/20* (2006.01)
*G09G 3/3208* (2016.01)

(52) U.S. Cl.
CPC ......... *G09G 3/2096* (2013.01); *G09G 3/3208* (2013.01); *G09G 2320/02* (2013.01); *G09G 2330/12* (2013.01)

(58) Field of Classification Search
CPC ............... G09G 3/2096; G09G 3/3208; G09G 2320/02; G09G 2330/12; G09G 3/20
See application file for complete search history.

(56) References Cited

U.S. PATENT DOCUMENTS

| | | | | |
|---|---|---|---|---|
| 8,624,817 | B2 | 1/2014 | Kim et al. | |
| 2010/0302214 | A1* | 12/2010 | Kim | H04N 13/398 345/204 |
| 2021/0335300 | A1* | 10/2021 | Wu | G09G 3/3648 |
| 2022/0139299 | A1* | 5/2022 | Pyun | H05K 3/361 345/204 |

* cited by examiner

*Primary Examiner* — Towfiq Elahi
(74) *Attorney, Agent, or Firm* — Innovation Counsel LLP

(57) ABSTRACT

An electronic device includes a display panel, a first timing controller, and a second timing controller. The first timing controller generates a first error flag signal, the second timing controller generates a second error flag signal, and the first timing controller and the second timing controller exchange the first error flag signal and the second error flag signal with each other. The first timing controller controls a first completion signal, and the second timing controller controls a second completion signal. When the first completion signal is activated and the second completion signal is activated, the first timing controller and the second timing controller drive the first display region and the second display region of the display panel.

20 Claims, 10 Drawing Sheets

ELECTRONIC DEVICE

CROSS-REFERENCE TO RELATED APPLICATIONS

This application claims priority under 35 U.S.C. § 119 to Korean Patent Application No. 10-2023-0163274 filed on Nov. 22, 2023, in the Korean Intellectual Property Office, the disclosure of which is incorporated by reference herein in its entireties.

BACKGROUND

The present disclosure relates to electronic devices with improved display quality.

In general, an electronic device capable of displaying images may include a display panel and a timing controller. The timing controller controls the overall operation of the display panel. For example, the timing controller may control the display plan to display an image. As the size of the display panel increases, computations needed for controlling the operation of the display panel may increase.

SUMMARY

Embodiments of the present disclosure may provide an electronic device improved in display quality.

According to an embodiment, an electronic device may comprise a display panel including a first display region and a second display region adjacent to the first display region, a first timing controller configured to drive the first display region, and a second timing controller configured to drive the second display region. The first timing controller may determine a first error state of the first display region and generate a first error flag signal indicating the first error state, the second timing controller may determine a second error state of the second display region and generate a second error flag signal indicating the second error state, the first timing controller and the second timing controller may exchange the first error flag signal and the second error flag signal with each other, the first timing controller may deactivate a first completion signal when at least one of the first error flag signal and the second error flag signal received in the second timing controller is activated, the second timing controller may deactivate a second completion signal when at least one of the second error flag signal and the first error flag signal received in the first timing controller is activated, and the first timing controller and the second timing controller may drive the first display region and the second display region of the display panel, respectively, when the first completion signal is activated and the second completion signal is activated.

The first timing controller may comprise a first correcting unit such as a register configured to store the first error flag signal, a first memory unit such as a flash memory configured to store the second error flag signal, a logic gate which receives the first error flag signal and the second error flag signal, and a controller to receive a first signal or a second signal from the logic gate to activate or deactivate the first completion signal based on the first signal or the second signal.

The logic gate may output the first signal when at least one of the first error flag signal and the second error flag signal is activated.

The logic gate may output the second signal different from the first signal when the first error flag signal is deactivated and the second error flag signal is deactivated.

The controller may activate the first completion signal when receiving the second signal.

The first timing controller may operate in an out-port mode to output the first completion signal having a low level when the first completion signal is deactivated.

The first timing controller may operate in an in-port mode when the first completion signal is activated, the second timing controller may operate in an out-port mode to output the second completion signal having a low level when the second completion signal is deactivated, and the first timing controller may receive the second completion signal having the low level.

The extended reality device may further include a pull-up resistor circuit applying a driving signal having a high level to the first timing controller and the second timing controller.

The first timing controller may operate in an in-port mode to receive the driving signal and the second timing controller operates in the in-port mode to receive the driving signal when the first completion signal is activated and the second completion signal is activated, and the first timing controller and the second timing controller may simultaneously drive the first display region and the second display region of the display panel when receiving the driving signal.

The first timing controller may perform a compensating operation on the first display region, and the first error state may be activated when the compensating operation is not performed.

The first timing controller may perform the compensating operation through a checksum and may generate the first error flag signal.

According to an embodiment, an electronic device may comprise a display panel including a display region configured to include a first display region and a second display region adjacent to the first display region, a first timing controller to drive the first display region, a second timing controller to drive the second display region, and a processor to drive the first timing controller and the second timing controller, the first timing controller may determine a first error state of the first display region to generate a first error flag signal, the second timing controller may determine a second error state of the second display region to generate a second error flag signal, the first timing controller and the second timing controller may provide the first error flag signal and the second error flag signal to the processor, the processor may deactivate a completion signal when at least one of the first error flag signal and the second error flag signal is activated, and the processor may drive the first display region and the second display region of the display panel, respectively, when the completion signal is activated.

The processor may comprise a logic gate which receives the first error flag signal and the second error flag signal, and a controller to receive a first signal or a second signal from the logic gate and to activate or deactivate the completion signal based on the first signal or the second signal.

The logic gate may be a logical sum gate.

The logic gate may output the first signal when at least one of the first error flag signal and the second error flag signal is activated.

The logic gate may output the second signal different from the first signal when the first error flag signal is deactivated and the second error flag signal is deactivated.

The controller may activate the completion signal when receiving the second signal.

The processor may output the completion signal activated by the first timing controller and the second timing controller, and the first timing controller and the second timing controller may simultaneously drive the first display region and the second display region of the display panel when receiving the completion signal.

The first timing controller may perform a compensating operation on the first display region, and the first error state may be activated when the compensating operation is not performed.

The first timing controller may perform the compensating operation through a checksum and may generate the first error flag signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
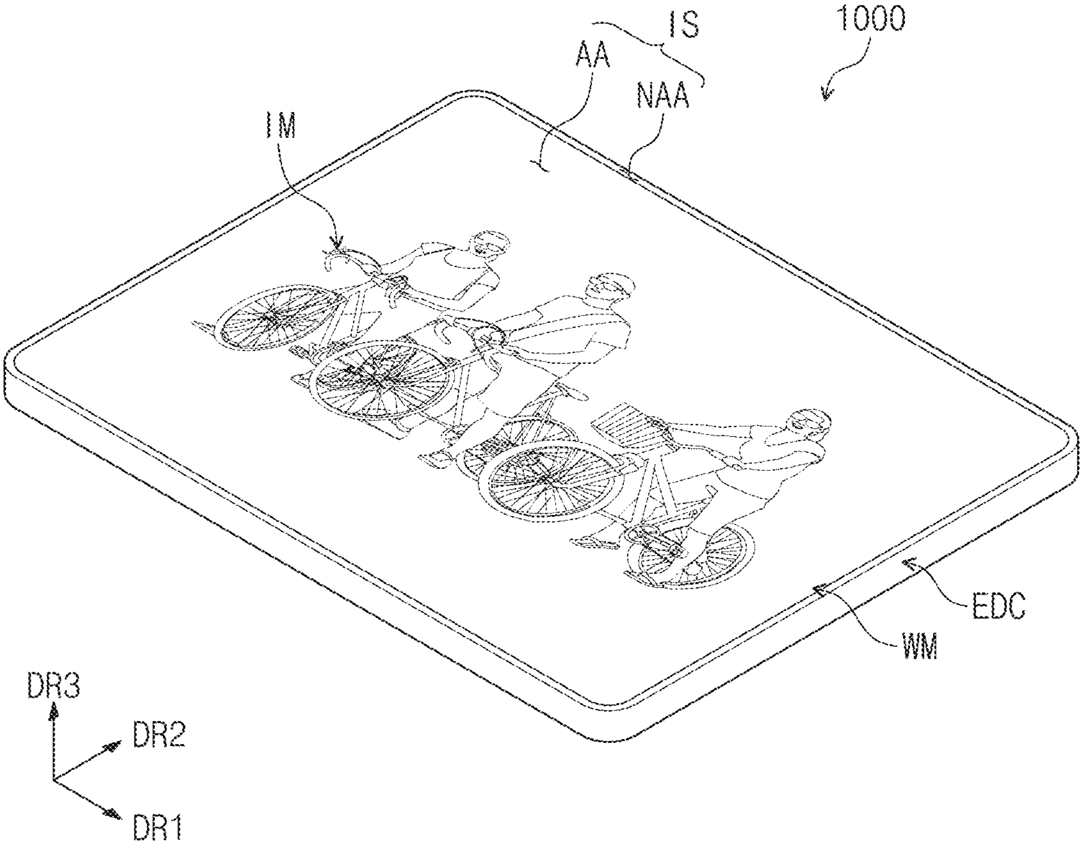
FIG. 1 is a perspective view of an electronic device according to an embodiment of the present disclosure.

In this specification, a first component (or region, layer, part, portion, etc.) being "on", "connected to", or "coupled to" a second component means that the first component is directly on, connected to, or coupled to the second component or that a third component is interposed therebetween.

The same reference numeral may be assigned to the same component shown in different drawings. In addition, in drawings, thicknesses, proportions, and dimensions of components may be exaggerated or otherwise altered to effectively illustrate technical features.

Although the terms "first", "second", etc. may be used to describe various components, the components should not be construed as being limited by these terms. The terms are only used to distinguish one component from another component. For example, without departing from the scope and spirit of the present disclosure, a first component may be referred to as a second component, and similarly, the second component may be referred to as the first component.

Terms such as "under", "at a lower portion", "above", "an upper portion" are used herein to describe relationships between components illustrated in drawings. Such terms are relative and are described with reference to a direction indicated in the drawing.

The terms "comprises," "comprising," "includes," or "including," or "having" specify the presence of stated features, numbers, steps, operations, components, parts, or the combination thereof but do not preclude the presence or addition of one or more other features, numbers, steps, operations, components, components, and/or the combination thereof. The term "and/or" includes any and all combinations of one or more of associated components. Singular forms used herein are intended to include the plural forms unless the context clearly indicates otherwise.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology and should not be interpreted in ideal or overly formal manner unless explicitly defined herein.

Hereinafter, embodiments of the present disclosure will be described with reference to accompanying drawings.

Figure 2:
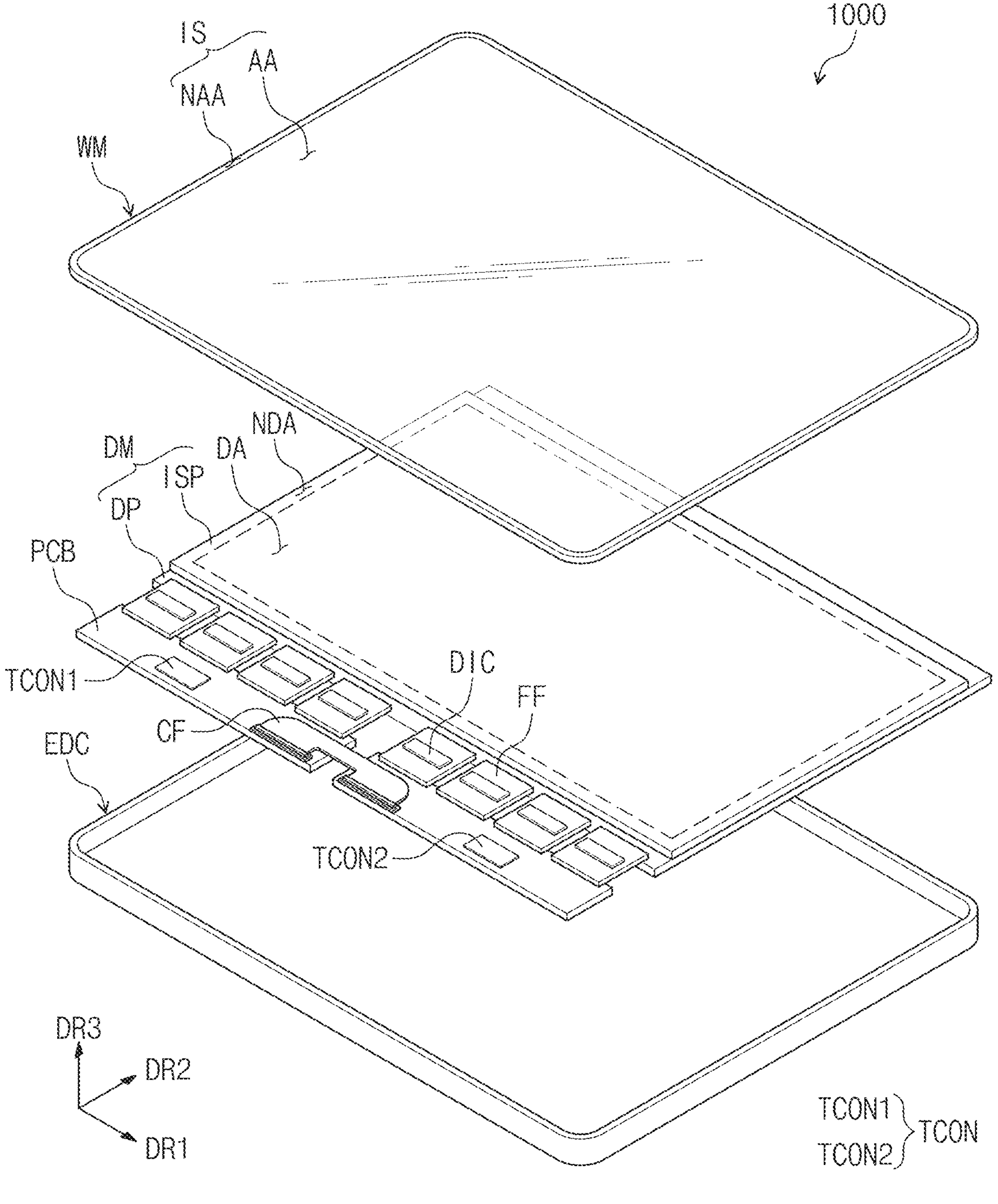
FIG. 2 is an exploded perspective view of an electronic device according to an embodiment of the present disclosure.

FIG. 1 is a perspective view of an electronic device according to an embodiment of the present disclosure, and FIG. 2 is an exploded perspective view of an embodiment of the electronic device shown in FIG. 1.

Referring to FIGS. 1 and 2, an electronic device 1000 is a device that may be activated in response to an electrical signal. According to the present disclosure, the electronic device 1000 may be a large-size electronic device, such as a television or a monitor, or a small or medium-size electronic device, such as a cellular phone, a tablet, a vehicle navigation system, or a game console. The electronic device 1000 is shown only for illustrative purposes. Devices other than the electronic device 1000 may be implemented in other forms without departing from the scope of the present disclosure. In the illustrated example, the electronic device 1000 has a rectangular shape with longer sides extending in a first direction DR1 and shorter sides extending in a second direction DR2, which is at an angle with the first direction DR1. However, the electronic device 1000 is not limited to being rectangular, but various electronic devices 1000 having various shapes may be provided. A display surface IS of the electronic device 1000 is parallel to the first direction DR1 and the second direction DR2 and may display an image IM that is viewable from a third direction DR3. The display surface IS may correspond to a front surface of the electronic device 1000.

According to an embodiment, the front surface (or top surfaces) and a back surface (or bottom surfaces) of members are defined based on surfaces that display the image IM. The front surface and the back surface are opposite to each other in the third direction DR3, and the normal direction to the front surface and the back surface may be parallel to the third direction DR3.

The distance in the third direction DR3 between the front surface and the back surface may correspond to the thickness of the electronic device 1000 in the third direction DR3. The first direction DR1, the second direction DR2, and the third direction DR3 may be defined relative to the electronic device 100 and may change.

The electronic device 1000 may be capable of sensing an external input applied to the electronic device 1000 from the outside. The external input may include various inputs applied from an outside of the electronic device 1000.

According to an embodiment of the present disclosure, the electronic device 1000 may sense an external input that the user applies. The external input of the user may include any one of various external inputs, such as a touch or proximity of a body part of the user, light, heat, or pressure, or the combination thereof. In addition to sensing the external input at the front surface of the electronic device 1000, the electronic device 1000 may sense the external input, which may be applied to the side surface or the back surface of the electronic device 1000. Sensing capability may depend on the structures of the electronic device 1000, and the present disclosure is not limited to any one embodiment. According to an embodiment of the present disclosure, the external input may include an input (for example, a stylus pen, an active pen, a touch pen, an electronic pen, or an e-pen).

The display surface IS of the electronic device 1000 may be divided into an active region AA and a non-active region NAA. The active region AA may be a region in which the image IM is displayed. A user may view the image IM through the active region AA. According to an embodiment, the active region AA is illustrated as a rectangular shape having rounded vertexes. However, the shape is provided for the illustrative purpose. For example, the active region AA may have various shapes and is not limited to any one embodiment.

The non-active region NAA may be adjacent to the active region AA. The non-active region NAA may have a specific color. The non-active region NAA may surround the active region AA. Accordingly, the shape of the active region AA may be substantially defined by the non-active region NAA. However, the shape and configuration shown in FIG. 1 is provided only for the illustrative purpose, and the non-active region AA may be adjacent to only one side of the active region AA or may be omitted. FIG. 1 shows the electronic device 1000 as an example embodiment of the present disclosure, and the present disclosure is not limited to the example embodiments.

As illustrated in FIG. 2, the electronic device 1000 may include a display module DM and a window WM disposed on the display module DM. The display module DM may include a display panel DP and an input sensing layer ISP.

According to an embodiment of the present disclosure, the display panel DP may be an emissive display panel. For example, the display panel DP may be an organic light emitting display panel, an inorganic light emitting display panel, or a quantum dot light emitting display panel. An organic light emitting display panel may include a light emitting layer containing an organic light emitting material. An inorganic light emitting display panel may include a light emitting layer containing an inorganic light emitting material. A light emitting layer of a quantum dot light emitting display panel may include a quantum dot and a quantum rod.

The display panel DP may output the image IM, and the image IM may be displayed on the display surface IS.

The input sensing layer ISP may be disposed on the display panel DP to sense the external input. The input sensing layer ISP may be directly on the display panel DP. According to an embodiment of the present disclosure, the input sensing layer ISP may be formed on the display panel DP through subsequent processes. In other words, when the input sensing layer ISP is directly disposed on the display panel DP, an internal adhesive film (not illustrated) is not interposed between the input sensing layer ISP and the display panel DP. However, an internal adhesive film may be interposed between the input sensing layer ISP and the display panel DP in some embodiments. In these cases, the input sensing layer ISP and the display panel DP may be separately fabricated and may be attached to each other through subsequent processes. In other words, after fabricating the input sensing layer ISP through a process separate from that of the display panel DP, the input sensing layer ISP may be fixed on a top surface of the display panel DP, e.g., using the inner adhesive film.

The window WM may include a transparent material through which the image IM on the display panel DP is visible. For example, the window WM may include glass, sapphire, or plastic. Although FIG. 2 shows an example in which the window WM is a single layer, the present disclosure is not limited thereto. For example, the window WM may include a plurality of layers.

The non-active region NAA of the electronic device 1000 described above may correspond to a region that is defined by printing a material including a specific color on the window WM. According to an embodiment of the present disclosure, the window WM may include a light blocking pattern to define the non-active region NAA. The light blocking pattern may include an organic layer having a color, and a coating process may form the light blocking pattern on the window WM.

An adhesive film may couple the window WM to the display module DM. According to an embodiment of the present disclosure, the adhesive film may include an optically clear adhesive (OCA) film. However, the adhesive film is not limited thereto, but may include a typical adhesive agent and adhesion agent. For example, the adhesive film may include optically clear resin (OCR) or a pressure sensitive adhesive (PSA) film.

An anti-reflective layer may also be between the window WM and the display module DM. The anti-reflective layer may decrease the reflectance of an external light incident on the electronic device 1000 from above the window WM. According to an embodiment of the present disclosure, the anti-reflective layer may include a phase retarder and a polarizer. The polarizer may be a film type or a liquid crystal coating type polarizer. The film type polarizer may include a stretched synthetic resin film, and the liquid crystal coating type polarizer may include liquid crystals arranged in a specific array. The retarder and the polarizer may be implemented with one polarization film.

According to an embodiment of the present disclosure, the anti-reflective layer may further include color filters. The arrangement of the color filters may be determined based on colors of light generated from a plurality of pixels PX (see FIG. 3) included in the display panel DP. In this case, the anti-reflective layer may further include a light blocking pattern interposed between color filters.

The display module DM may respond to an electrical signal to display the image IM or transmit/receive information based on an external input. The display module DM may include a display region DA and a non-display region NDA. The display region DA may be a region where the image IM from the display panel DP is output or displayed. In addition, the display region DA may be a region in which the input sensing layer ISP senses the external input applied from outside the electronic device 1000. According to an embodiment, the display region DA of the display module DM may correspond to at least a portion of the active region AA.

The non-display region NDA may be a region in which the image IM is not displayed. For example, the non-display region NDA may surround the display region DA as shown in FIG. 2. However, FIG. 2 merely shows an example structure for the illustrative purpose. For example, the non-display region NDA may have various structures, and not limited to the illustrated embodiment. According to an embodiment, the non-display region NDA of the display module DM may correspond to (e.g., overlap) at least a portion of the non-active region NAA.

The electronic device 1000 may include a plurality of flexible films FF connected to the display panel DP. A data driving circuit DIC may be mounted on each flexible film FF. According to an embodiment of the present disclosure, a plurality of data driving circuits DIC may be provided, and the data driving circuits DIC may be respectively mounted on the flexible films FF.

The electronic device 1000 may further include at least one printed circuit board PCB coupled to the plurality of flexible films FF. Although FIG. 2 shows two printed circuit boards PCB in the electronic device 1000, the number of printed circuit boards PCB is not limited thereto. Two adjacent printed circuit boards PCB of the printed circuit boards PCB may be electrically connected to each other by a connection film CF. In addition, at least one of the printed circuit boards PCB may be electrically connected to a main board.

A timing controller TCON may be disposed on the printed circuit boards PCB. The timing controller TCON may include a first timing controller TCON1 and a second timing controller TCON2. The first timing controller TCON1 may be disposed on one printed circuit board of the printed circuit boards PCB, and the second timing controller TCON2 may be disposed on another printed circuit board of the printed circuit boards PCB.

FIG. 2 illustrates an example in which the plurality of data driving circuits DIC are mounted on the plurality of flexible films FF, but the present disclosure is not limited thereto. For example, the plurality of data driving circuits DIC may be directly mounted on the display panel DP. For example, the data driving circuit DIC may be mounted on a portion of the display panel DP that is bent and the data driving circuit DIC may be disposed on the rear surface of the display module DM.

The input sensing layer ISP may be electrically connected to the printed circuit board PCB through the plurality of flexible films FF. However, the present disclosure is not limited thereto. For example, the display module DM may further include an additional flexible film to electrically connect the input sensing layer ISP to the printed circuit board PCB.

The electronic device 1000 may further include a housing EDC to receive the display module DM. The housing EDC may be coupled to the window WM to define an outer appearance of the electronic device 1000. The housing EDC may absorb the impact applied from the outside and prevent a foreign substance or moisture from infiltrating into the display module DM, so that the housing EDC generally protects components contained in the housing EDC. According to an embodiment of the present disclosure, the housing EDC may have a form designed to receive and hold the internal components of the electronic device 1000.

The electronic device 1000 according to an embodiment may further include an electronic module including various functional modules to operate the display module DM, a power supply module (e.g., a battery) to supply power necessary for overall operations of the electronic device 1000, a bracket coupled with the display module DM, and/or the housing EDC to partition an inner space of the electronic device 1000.

Figure 3:
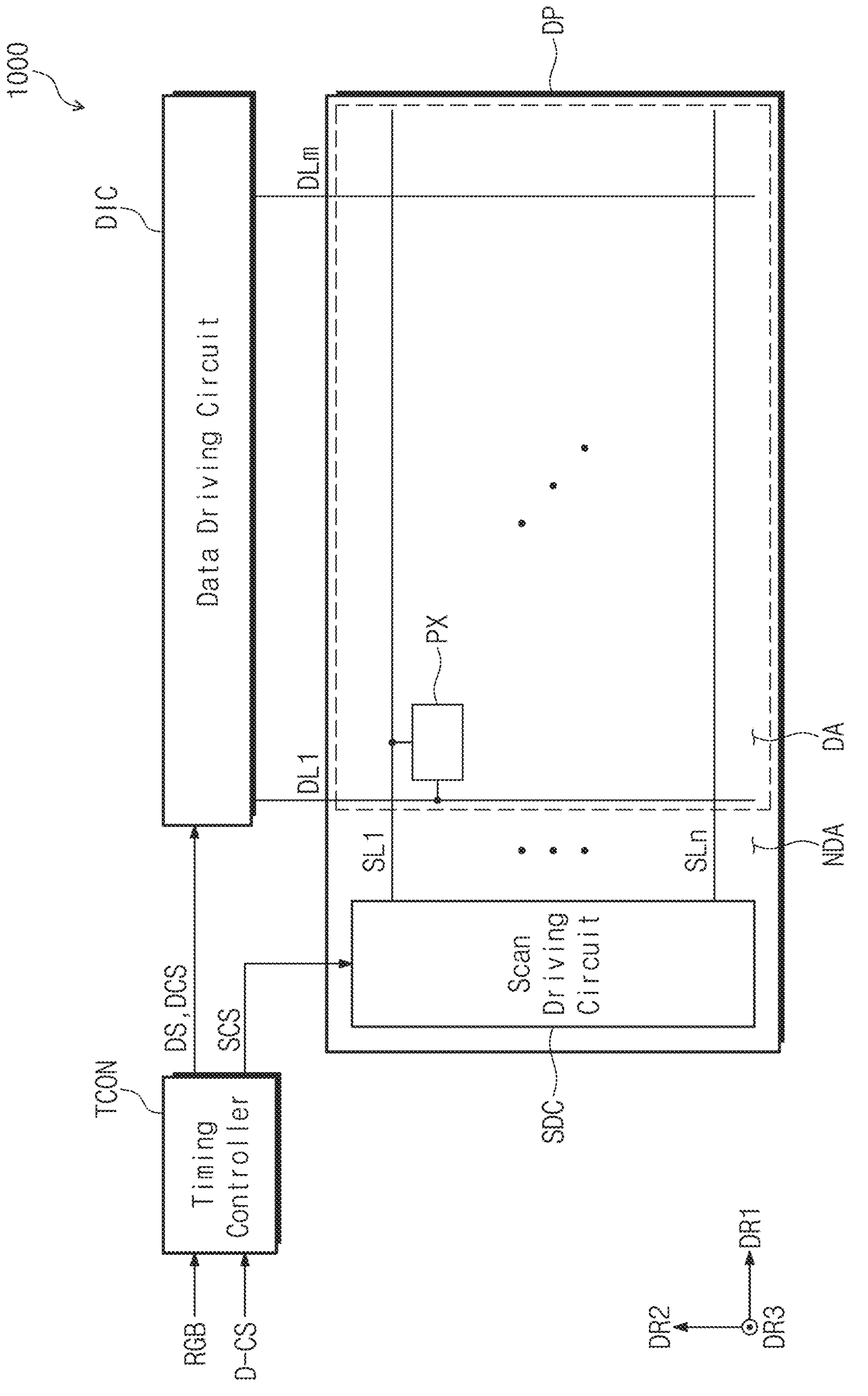
FIG. 3 is a block diagram of an electronic device according to an embodiment of the present disclosure.

FIG. 3 is a block diagram of an electronic device according to an embodiment of the present disclosure.

Referring to FIG. 3, the electronic device 1000 may include the display panel DP, the timing controller TCON, the data driving circuit DIC, and a scan driving circuit SDC.

The timing controller TCON may receive input data RGB and a control signal D-CS from a processor or external controller (not shown). The external controller may include a graphic processor. The control signal D-CS may include various signals. For example, the control signal D-CS may include an input vertical synchronization signal, an input horizontal synchronization signal, a main clock, and a data enable signal.

The timing controller TCON may generate image data DS obtained by converting the data format of the input data RGB to meet interface specifications of the data driving circuit DIC. In this case, the timing controller TCON may perform a compensating operation to generate the image data DS. The image data DS may, for example, include first image data DS1 (see FIG. 4) and second image data DS2 (see FIG. 4).

The timing controller TCON may generate a scan control signal SCS and a data control signal DCS, in response to the control signal D-CS.

The data driving circuit DIC may use the data control signal DCS and the image data DS from the timing controller TCON to output grayscale voltages for driving the plurality of data lines DL1 to DLm. The data driving circuit DIC may be implemented in the form of an integrated circuit that may be directly mounted in a specific region of the display panel DP or may be mounted, in the chip on film manner, on a separate printed circuit board such that the data driving circuit DIC electrically connects to the display panel DP. Alternatively, the data driving circuit DIC may not be a separate integrated circuit but may be formed through the same process that form the circuit layer in the display panel DP.

The display panel DP may be divided into the display region DA and the non-display region NDA. A plurality of pixels PX may be disposed in the display region DA, and the scan driving circuit SDC may be disposed in the non-display region NDA.

The display panel DP may include a plurality of scan lines SL1 to SLn, the plurality of data lines DL1 to DLm, the plurality of pixels PX, and the scan driving circuit SDC. Each of the plurality of pixels PX may be connected to a relevant data line among the plurality of data lines DL1 to DLm and may be connected to a relevant scan line among the plurality of scan lines SL1 to SLn. According to an embodiment of the present disclosure, the display panel DP further includes light emission control lines, and the electronic device 1000 may further include a light emission driving circuit that provides control signals to the light emission control lines. The configuration of the display panel DP is not particularly limited.

The plurality of scan lines SL1 to SLn may extend parallel to the first direction DR1. The plurality of scan lines SL1 to SLn may be spaced apart from each other in the second direction DR2. The plurality of data lines DL1 to DLm may extend parallel to the second direction DR2 from the data driving circuit DIC. The plurality of data lines DL1 to DLm may be spaced apart from each other in the first direction DR1.

The plurality of pixels PX may be electrically connected to the plurality of scan lines SL1 to SLn and the plurality of data lines DL1 to DLm. For example, pixels in a first row of a pixel array may be connected to the scan lines SL1, and pixels in a first column of the pixel array may be connected to the data line DL1.

The scan driving circuit SDC may drive the plurality of scan lines SL1 to SLn in response to the scan control signal SCS. According to an embodiment of the present disclosure, the scan driving circuit SDC may be formed in the same process that forms the circuit layer in the display panel DP, but the present disclosure is not limited thereto. For example, the scan driving circuit SDC may be implemented in the form of a separate integrated circuit (IC) that may be mounted directly in a specific region of the display panel DP or mounted in a chip on film (COF) manner on a separate printed circuit board, such that the scan driving circuit SDC, so that the scan driving circuit SDC is electrically connected to the display panel DP.

Figure 4:
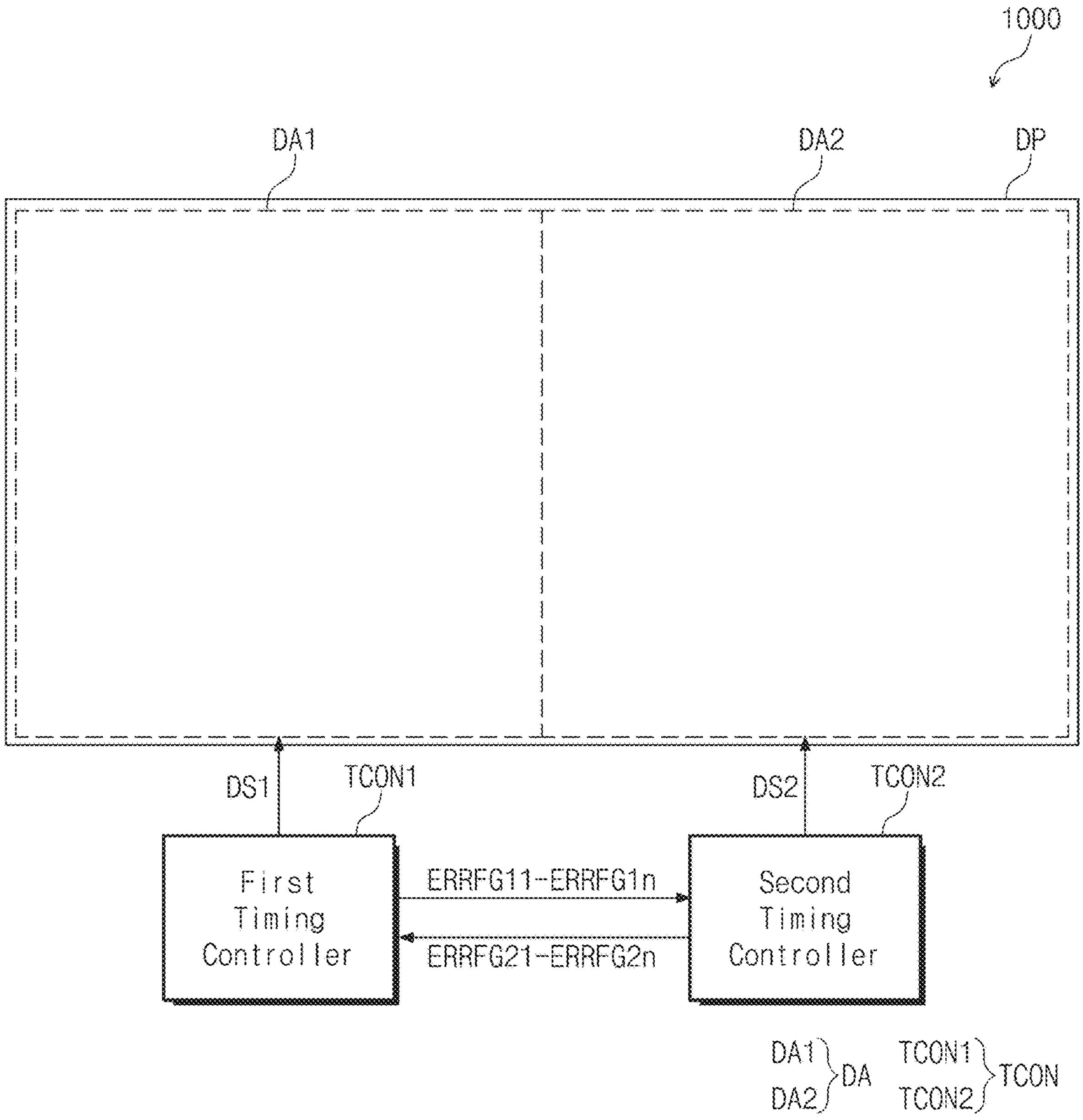
FIG. 4 shows a display panel and a timing controller according to an embodiment of the present disclosure.

FIG. 4 is a block diagram illustrating a display panel and a timing controller according to an embodiment of the present disclosure.

Referring to FIG. 4, the timing controller TCON may include a plurality of timing controllers. For example, in the embodiment of FIG. 4, the timing controller TCON includes the first timing controller TCON1 and the second timing controller TCON2. In other embodiments, more than two timing controllers may be employed.

The display region DA of the display panel DP may include a first display region DA1 and a second display region DA2 adjacent to the first display region DA1 as shown in the embodiment of FIG. 4. The first timing controller TCON1 may control the first display region DA1, and the second timing controller TCON2 may control the second display region DA2.

The first timing controller TCON1 may determine a first error state and generate a plurality of first error flag signals ERRFG11 to ERRFG1*n*. Determining the first error state may include determining whether compensating data, which is for performing a compensating operation, is loaded in the first display region DAL. For example, the first timing controller TCON1 may activate the first error state when the compensating operation is not performed. When the first error state is activated, the plurality of first error flag signals ERRFG11 to ERRFG1*n* may be activated. The first timing controller TCON1 may be referred to as a master timing controller.

The second timing controller TCON2 may determine a second error state and generate a plurality of second error flag signals ERRFG21 to ERRFG2*n*. Determining the second error state may include determining whether compensating data, which is for performing the compensating operation, is loaded in the second display region DA2. For example, the second timing controller TCON2 may activate the second error state when the compensating operation is not performed. When the second error state is activated, the plurality of second error flag signals ERRFG21 to ERRFG2*n* may be activated. The second timing controller TCON2 may be referred to as a slave timing controller.

The first timing controller TCON1 and the second timing controller TCON2 may exchange the plurality of first error flag signals ERRFG11 to ERRFG1*n* and the plurality of second error flag signals ERRFG21 to ERRFG2*n* with each other.

The first timing controller TCON1 may generate the first image data DS1 based on the input data RGB (see FIG. 3). The first timing controller TCON1 may determine the output timing of the first image data DS1 based on the plurality of first error flag signals ERRFG11 to ERRFG1*n* and the plurality of second error flag signals ERRFG21 to ERRFG2*n*. The first timing controller TCON1 may drive the first display region DA1 based on the first image data DS1.

The second timing controller TCON2 may generate the second image data DS2 based on the input data RGB (see FIG. 3). The second timing controller TCON2 may determine the output timing of the second image data DS2 based on the plurality of first error flag signals ERRFG11 to ERRFG1*n* and the plurality of second error flag signals ERRFG21 to ERRFG2*n*. As described further below, the second timing controller TCON2 may drive the second display region DA2 based on the second image data DS2.

Figure 5A:
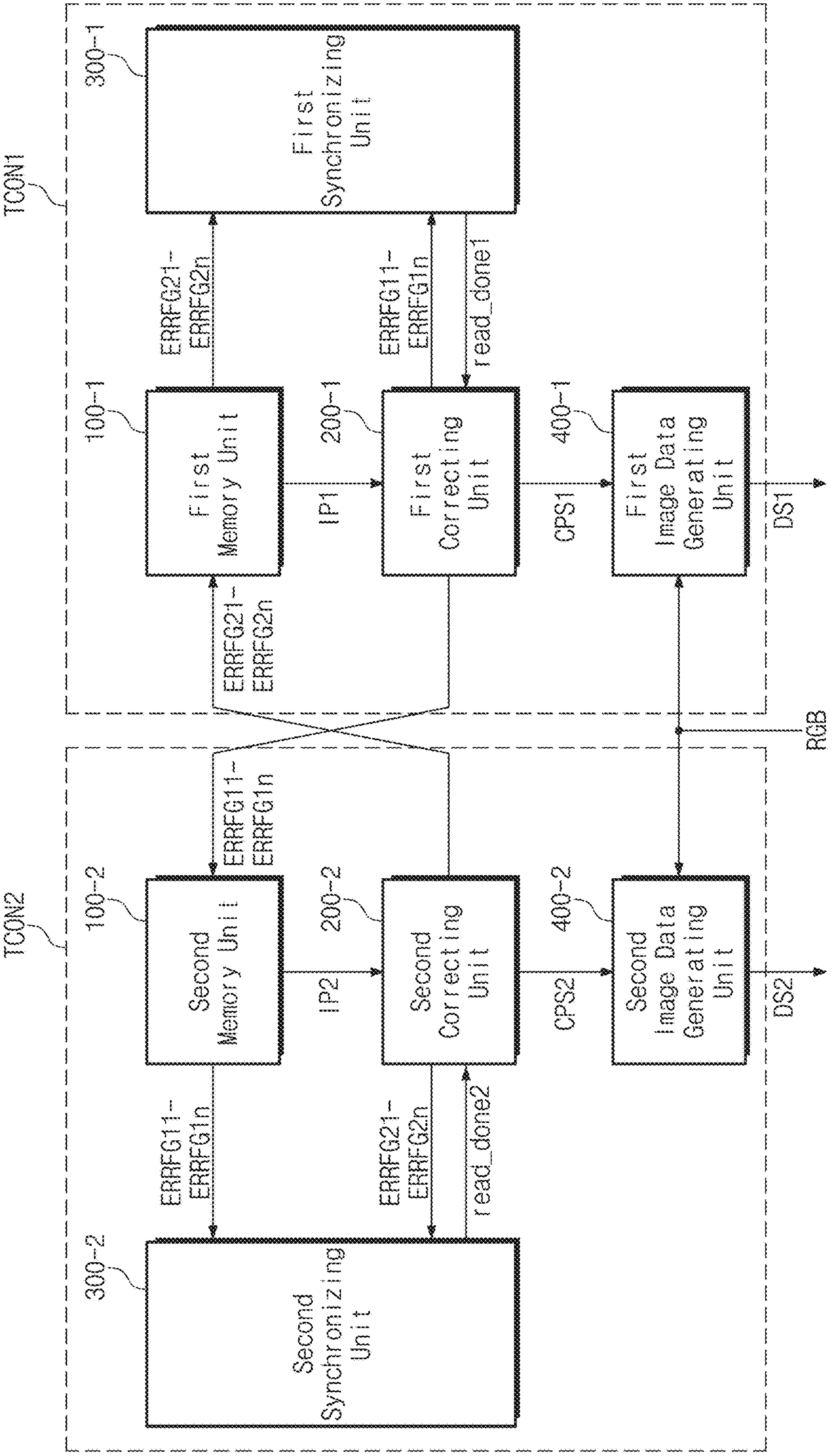
FIG. 5A is a block diagram illustrating a first timing controller and a second timing controller according to an embodiment of the present disclosure.
Figure 5B:
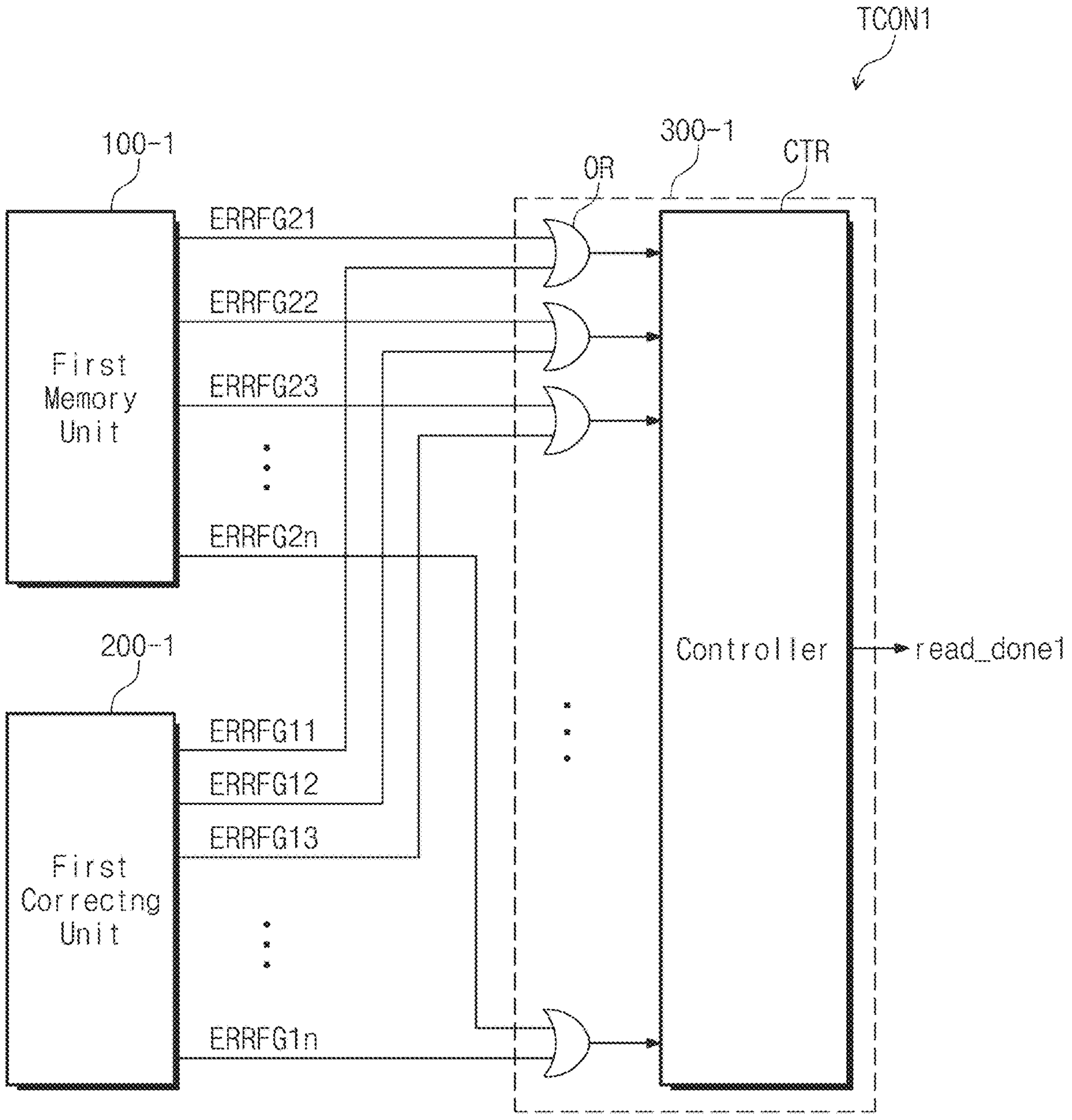
FIG. 5B is a block diagram illustrating a first timing controller according to an embodiment of the present disclosure.
Figure 6:
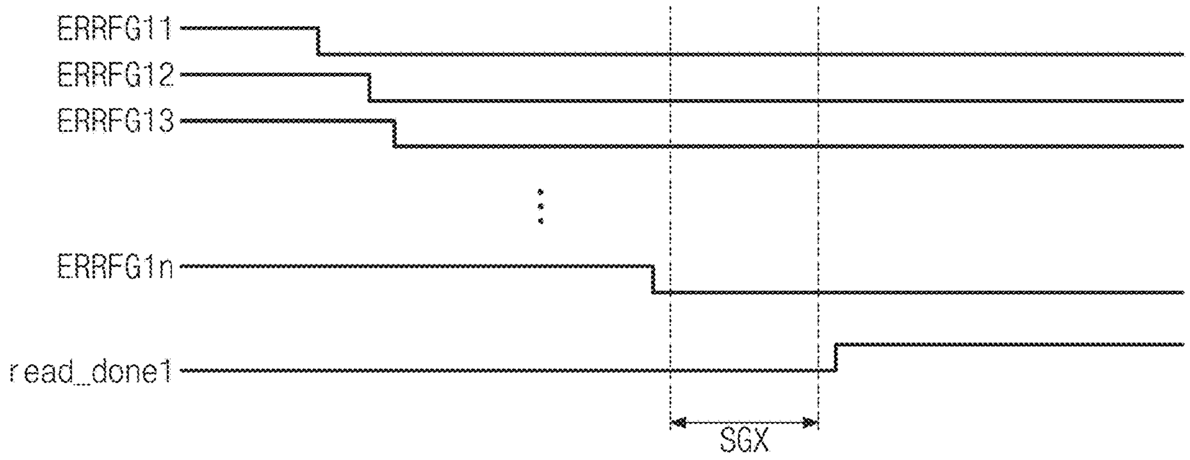
FIG. 6 is a timing diagram illustrating first error flag signals and a first completion signal according to an embodiment of the present disclosure.

FIG. 5A is a block diagram showing a first timing controller and a second timing controller according to an embodiment of the present disclosure, FIG. 5B is a block diagram illustrating a first timing controller according to an embodiment of the present disclosure, and FIG. 6 is a timing diagram illustrating first error flag signals and a first completion signal according to an embodiment of the present disclosure.

Referring to FIGS. 4, 5A, 5B, and 6, the first timing controller TCON1 may include a first memory unit 100-1, a first correcting unit 200-1, a first synchronizing unit 300-1, and a first image data generating unit 400-1. The second timing controller TCON2 may include a second memory unit 100-2, a second correcting unit 200-2, a second synchronizing unit 300-2, and a second image data generating unit 400-2.

The first memory unit 100-1 may include memory such as a flash memory. The first memory unit 100-1 may store a plurality of first compensating data IP1 that may be used for performing various compensating operations in the first display region DA1. The first memory unit 100-1 may transmit the plurality of first compensating data IP1 to the first correcting unit 200-1. As described further below, the first memory unit 100-1, e.g., the flash memory, may receive and store the second error flag signals ERRFG21 to ERRFG2*n* and may transmit the second error flag signals ERRFG21 to ERRFG2*n* to the first synchronizing unit 300-1.

The first correcting unit 200-1 may perform a checksum operation while loading each first compensating data IP1. The checksum operation may, for example, calculate a checksum value from loaded first compensating data IP1 and compare the calculated checksum value to a stored checksum value for the first compensating data IP1 to confirm that the first compensating data IP1 has been successfully and correctly loaded into the first correcting unit 200-1. The plurality of first error flag signals ERRFG11 to ERRFG1*n* may be deactivated during the loading of the plurality of first compensating data IP1 into the first correcting unit 200-1. If loading of the first compensating data IP1 into the first correcting unit 200-1 fails, a first error flag signal, which corresponds to the first compensating data IP1 that failed to load, among the plurality of first error flag signals ERRFG11 to ERRFG1*n* may be activated. In other words, each of the first error flag signals ERRFG11 to ERRFG1*n* may be activated or deactivated depending on whether the first compensating data IP1 corresponding to that first error flag was successfully loaded.

The first correcting unit 200-1 may include memory such as a register. The first correcting unit 200-1 may store values respectively corresponding to the first error flag signals ERRFG11 to ERRFG1*n*. The first correcting unit 200-1 may transmit the plurality of first error flag signals ERRFG11 to ERRFG1*n* to the first synchronizing unit 300-1.

The plurality of first error flag signals ERRFG11 to ERRFG1*n* may be activated to have in a high level before the first correcting unit 200-1 performs the checksum operation. When determination of the checksums is complete and indicates that each of the plurality of first compensating data IP1 is not damaged, the first error flag signals ERRFG11 to ERRFG1*n* may be switched to be in a low level, e.g., deactivated. The plurality of first compensating data IP1 may be sequentially transmitted to the first correcting unit 200-1, and the first correcting unit 200-1 may sequentially generate the plurality of first error flag signals ERRFG11 to ERRFG1*n* by sequentially checking the plurality of first compensating data IP1.

When the checksum operation for the plurality of first compensating data IP1 are completed, a signal exchange period SGX may start. During the signal exchange period SGX, the first correcting unit 200-1 may transmit the plurality of first error flag signals ERRFG11 to ERRFG1*n* to the second memory unit 100-2 of the second timing controller TCON2. In addition, the first memory unit 100-1, e.g., the flash memory, may receive and store the plurality of second error flag signals ERRFG21 to ERRFG2*n* from the second correcting unit 200-2 of the second timing controller TCON2 during the signal exchange period SGX. Various communication interfaces or protocols may be used for communication between the first timing controller TCON1 and the second timing controller TCON2. For example, a low voltage differential signaling (LVDS), "advanced intra panel interface (AiPi)++", or a "V by one" communication may be used.

The first synchronizing unit 300-1 may include a logic gate OR and a controller CTR. A plurality of logic gates OR may be provided, and each of the logic gates OR may receive a relevant one of the first error flag signals ERRFG11 to ERRFG1*n* and a relevant one of the plurality of second error flag signals ERRFG21 to ERRFG2*n*. For example, a first logic gate among the plurality of logic gates OR may receive first-first error flag signal ERRFG11 and second-first error flag signal ERRFG21, and a second logic gate OR among the plurality of logic gates OR may receive first-second error flag signal ERRFG12 and second-second error flag signal ERRFG22.

The first logic gate OR may output a first signal when at least one of the first-first error flag signal ERRFG11 and the second-first error flag signal ERRFG21 is activated. The first signal may be in a high level. In other words, when an error occurs and when the first or second compensating data IP1 or IP2 are loaded from the first timing controller TCON1 or the second timing controller TCON2, respectively, the first signal may be output from the first logic gate OR. While the second compensation data IP2 is loaded, the second error flag signals ERRFG21 to ERRFG2*n* may be activated or deactivated, and operation of the second compensation data IP2 is described further below.

When the first-first error flag signal ERRFG11 is deactivated and the second-first error flag signal ERRFG21 is deactivated, the first logic gate OR may output a second signal different from the first signal. The second signal may be in a low level. In other words, when an error does not occur and when the first and second compensating data IP1 and IP2 are loaded from the first and second timing controllers TCON1 and TCON2, respectively, the second signal may be output from the first logic gate OR. Each of the logic gates OR may be a logical sum gate.

The controller CTR may receive first signals and/or second signals from the plurality of logic gates OR. When receiving at least one first signal from the plurality of logic gates OR, the controller CTR may deactivate a first completion signal read_done1 and output the first completion signal read_done1 having a deactivated state to the first correcting unit 200-1. Alternatively, when receiving only the second signals from each of the plurality of logic gates OR, the controller CTR may activate the first completion signal read_done1 and output the first completion signal read_done1 having an activated state to the first correcting unit 200-1. In other words, the first synchronizing unit 300-1 may output the first completion signal read_done1 to the first correcting unit 200-1. In other words, the first completion signal read_done1 may be activated when all first compensating data IP1 is normally loaded from the first timing controller TCON1.

The first correcting unit 200-1 may receive the first completion signal read_done1 from the controller CTR. The first correcting unit 200-1 may generate a first correction signal CPS1 to apply the first compensating data IP1 to the input data RGB, based on the first completion signal read_done1. For example, the first correcting unit 200-1 may generate the first correction signal CPS1 when the first completion signal read_done1 is activated. The first correcting unit 200-1 may output the first correction signal CPS1 to the first image data generating unit 400-1.

The first image data generating unit 400-1 may receive the input data RGB and the first correction signal CPS1. The first image data generating unit 400-1 may generate the first image data DS1 by correcting the input data RGB based on the first correction signal CPS1.

The configuration of the second timing controller TCON2 may be substantially the same as the configuration of the first timing controller TCON1.

The second memory unit 100-2 may store a plurality of second compensating data IP2 for performing various compensating operations in the second display region DA2. The second memory unit 100-2 may transmit the plurality of second compensating data IP2 to the second correcting unit 200-2. The plurality of second compensating data IP2 may be data for performing substantially the same type of compensating operation as the compensating operation that uses the plurality of first compensating data IP1.

The second correcting unit 200-2 may perform a checksum operation while loading the plurality of second compensating data IP2. Accordingly, when loading of the plurality of second compensating data IP2 into the second correcting unit 200-2 has successfully completed, the plurality of second error flag signals ERRFG21 to ERRFG2*n* may be deactivated. When loading of the plurality of second compensating data IP2 into the second correcting unit 200-2 fails, a second error flag signal, which corresponds to one of the second compensating data IP2 that failed to successfully load, among the plurality of first error flag signals ERRFG21 to ERRFG2*n* may be activated. In other words, each of the second error flag signals ERRFG21 to ERRFG2*n* may be activated or deactivated depending on whether the second compensating data IP2 corresponding to that second error flag was successfully loaded.

The second correcting unit 200-2 may store the plurality of second error flag signals ERRFG21 to ERRFG2*n* and transmit the plurality of second error flag signals ERRFG21 to ERRFG2*n* to the second synchronizing unit 300-2.

The plurality of second error flag signals ERRFG21 to ERRFG2*n* may be activated to be in a high level before the checksum operation is performed in the second correcting unit 200-2. When the checksum operation determines that none of the plurality of second compensating data IP2 are damaged, the plurality of second error flag signals ERRFG21 to ERRFG2*n* may be deactivated, e.g., switched to be in a low level. The plurality of second compensating data IP2 may be sequentially transmitted from the second memory unit 100-2 to the second correcting unit 200-2, and the second correcting unit 200-2 may sequentially generate the plurality of second error flag signals ERRFG21 to ERRFG2*n* by sequentially checking the second compensating data IP2.

The signal exchange period SGX may start when the checksum operation on the plurality of second compensating data IP2 is completed. During the signal exchange period SGX, the second correcting unit 200-2 may transmit the plurality of second error flag signals ERRFG21 to ERRFG2*n* to the first memory unit 100-1 of the first timing controller TCON1. In addition, the second memory unit 100-2 may receive and store the plurality of first error flag signals ERRFG11 to ERRFG1*n* from the first correcting unit 200-1 of the first timing controller TCON1 during the signal exchange period SGX.

When an error occurs in loading the plurality of second compensating data IP2, the second synchronizing unit 300-2 may deactivate a second completion signal read_done2 and output the second completion signal read_done2 having a deactivated state to the second correcting unit 200-2. Alternatively, when the plurality of second compensating data IP2 are loaded without any errors, the second synchronizing unit 300-2 may activate the second completion signal read_done2 and output the second completion signal read_done2 having an activated state to the second correcting unit 200-2. In other words, the second synchronizing unit 300-2 may output the second completion signal read_done2 to the second correcting unit 200-2, and the second completion signal read_done2 may be activated when all second compensating data IP2 was normally loaded in the second timing controller TCON2.

The second correcting unit 200-2 may receive the second completion signal read_done2. The second correcting unit 200-2 may generate a second correction signal CPS2 and apply the plurality of second compensating data IP2 to the input data RGB based on the second completion signal read_done2. For example, the second correcting unit 200-2 may generate the second correction signal CPS2 when the second completion signal read_done2 is activated. The second correcting unit 200-2 may output the second correction signal CPS2 to the second image data generating unit 400-2.

The second image data generating unit 400-2 may receive the input data RGB and the second correction signal CPS2. The second image data generating unit 400-2 may generate the second image data DS2 by correcting the input data RGB based on the second correction signal CPS2. Image quality may be degraded when a loading error of one of the plurality of first and second compensating data IP1 and IP2 occurs in one of the first and second timing controllers TCON1 and TCON2 if the timing controller having no error performs the compensating operation to output image data, and the timing controller having an error outputs image data without performing the compensating operation. In particular, the compensating operation may be performed in only one of the first and second display regions DA1 and DA2, and a user may recognize a difference in image quality between the first and second display regions DA1 and DA2. However, according to the present disclosure, the first timing controller TCON1 and the second timing controller TCON2 detect loading errors of the plurality first and second compensating data IP1 and IP2, respectively, to generate the plurality of first error flag signals ERRFG11 to ERRFG1*n* and the plurality of second error flag signals ERRFG21 to ERRFG2*n*, respectively, and the first timing controller TCON1 and the second timing controller TCON2 exchange the plurality of first error flag signals ERRFG11 to ERRFG1*n* and the plurality of second error flag signals ERRFG21 to ERRFG2*n*. When at least one of the first error flag signal ERRFG11 to ERRFG1*n* or the second error flag signal ERRFG21 to ERRFG2*n* is activated, the first timing controller TCON1 and the second timing controller TCON2 may not perform the compensating operation in the first display region DA1 and the second display region DA2, respectively. In other words, the compensating operation may be prevented from being performed in only one of the first display region DA1 and the second display region DA2. Accordingly, the electronic device 1000 may have improved display quality.

Figure 7:
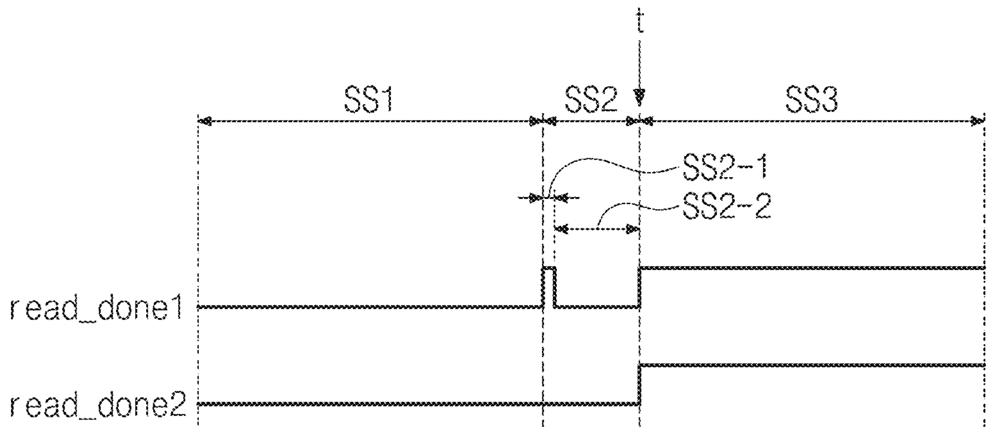
FIG. 7 is a timing diagram illustrating a first completion signal and a second completion signal according to an embodiment of the present disclosure.
Figure 8:
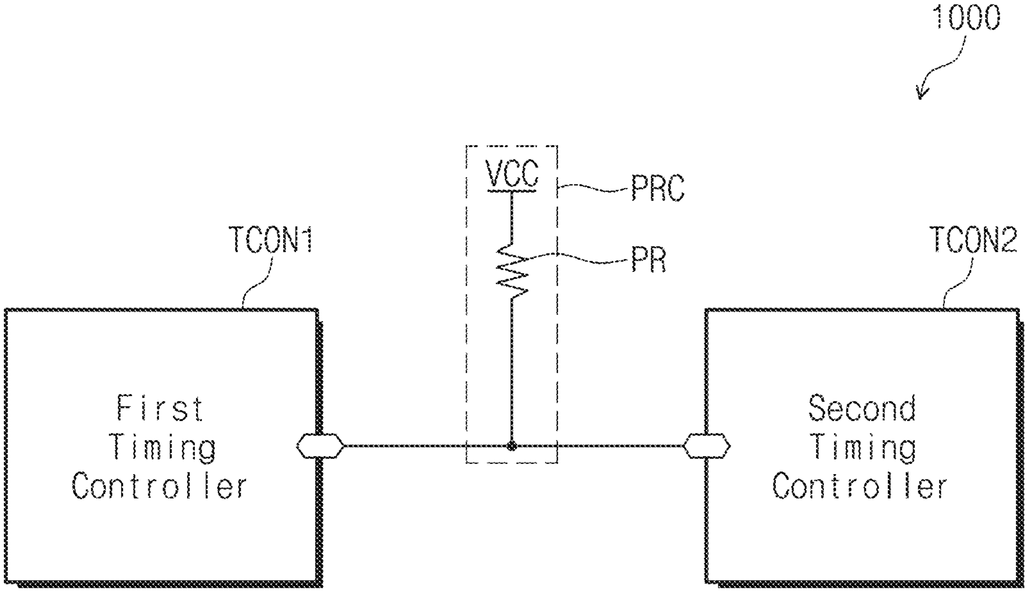
FIG. 8 is a block diagram illustrating a first timing controller, a second timing controller, and a pull-up resistor circuit according to an embodiment of the present disclosure.

FIG. 7 is a timing diagram illustrating a first completion signal and a second completion signal according to an embodiment of the present disclosure. FIG. 8 is a block diagram illustrating a first timing controller, a second timing controller, and a pull-up resistor circuit according to an embodiment of the present disclosure.

Referring to FIGS. 4, 5A, 7, and 8, the electronic device 1000 may further include a pull-up resistor circuit PRC.

The pull-up resistor circuit PRC may be electrically connected between the first timing controller TCON1 and the second timing controller TCON2. The pull-up resistor circuit PRC may apply a driving signal VCC to the first timing controller TCON1 and the second timing controller TCON2, and the driving signal VCC may have the same voltage level as the high (or activated) levels of the first completion signal read_done1 and the second completion signal read_done2.

The pull-up resistor circuit PRC may include a pull-up resistor PR connected to ports of the first timing controller TCON1 and the second timing controller TCON2. The pull-up resistor RC may be linked to the driving signal VCC to prevent the ports of the first timing controller TCON1 and the second timing controller TCON2 from floating when the port of the first timing controller TCON1 is in an in-port mode and the port of the second timing controller TCON2 is in an in-port mode. (The in-port mode being a mode in which the port may receive an input signal.) In other words, when the port of the first timing controller TCON1 is in the in-port mode and the port of the second timing controller TCON2 is in the in-port mode, the ports of the first timing controller TCON1 and the second timing controller TCON2 may receive the driving signal VCC.

The loading of the plurality of first compensating data IP1 of the first timing controller TCON1 and the loading of the plurality of second compensating data IP2 of the second timing controller TCON2 may not be completed during a first period SS1 shown in FIG. 7. Accordingly, the first completion signal read_done1 and the second completion signal read_done2 may be deactivated during the first period SS1. When the first completion signal read_done1 and the second completion signal read_done2 are deactivated, the ports of the first timing controller TCON1 and the second timing controller TCON2 may operate in an out-port mode. (The out-port mode being a mode in which the port may transmit an output signal.) The port of the first timing controller TCON1 may output the first completion signal read_done1 having the deactivated state and the port of the second timing controller TCON2 may output the second completion signal read_done2 having the deactivated state.

A second period SS2 may include a second-first period SS2-1 and a second-second period SS2-2. During the second-first period SS2-1, the loading of the plurality of first compensating data IP1 into the first timing controller TCON1 may be complete, and the loading of the plurality of second compensating data IP2 into the second timing controller TCON2 may not be complete. During the second-first period SS2-1, the first completion signal read_done1 may be activated and the second completion signal read_done2 may be deactivated. When the first completion signal read_done1 is activated, the port of the first timing controller TCON1 may operate in the in-port mode. The second completion signal read_done2 may be deactivated, so the port of the second timing controller TCON2 may be maintained to be in the out-port mode. During the second-second period SS2-2, the second timing controller TCON2 outputs the second completion signal read_done2 having the deactivated state, and the first timing controller TCON1 may receive the second completion signal read_done2 having the deactivated state through the port operating in the in-port mode, and thus the first completion signal read_done1 may be maintained in the substantially deactivated state.

During a third period SS3, the loading of the plurality of first and second compensating data IP1 and IP2 into the first timing controller TCON1 and the second timing controller TCON2 may be completed. In other words, a time point 't' of the third period SS3 may be a time point at which the loading of the plurality of second compensating data IP2 into the second timing controller TCON2 is completed. The first completion signal read_done1 and the second completion signal read_done2 may be activated. When the second completion signal read_done2 is activated, the port of the second timing controller TCON2 may operate in the in-port mode. In other words, during the third period SS3, the port of the first timing controller TCON1 may operate in the in-port mode, and the port of the second timing controller TCON2 may operate in the in-port mode. The ports of the first timing controller TCON1 and the second timing controller TCON2 may receive the driving signal VCC from the pull-up resistor circuit PRC. During the third period SS3, the first completion signal read_done1 and the second completion signal read_done2 may be substantially simultaneously activated to be in a high level at the time point 't' of synchronization.

As described above, the first correcting unit 200-1 of the first timing controller TCON1 and the second correcting unit 200-2 of the second timing controller TCON2 may simultaneously activate the first completion signal read_done1 and the second completion signal read_done2 at the synchronization time point 't' and output the first completion signal read_done1 having the activated state and the second completion signal read_done2 having the activated state to the first image data generating unit 400-1 and the second image data generating unit 400-2, respectively. Accordingly, the time points to output the first image data DS1 and the second image data DS2, which are compensated, provided to the first display region DA1 and the second display region DA2, respectively, may be synchronized with each other.

The electronic device 1000 of the present disclosure can avoid image degradation that could otherwise occur during the second period SS2. In particular, if the port of the first timing controller TCON1 did not operate in the in-port mode, so the first completion signal read_done1 is activated and the second completion signal read_done2 is deactivated, the first timing controller TCON1 may perform the compensating operation on the first display region DA1. As a result, since the second completion signal read_done2 is not activated yet, the compensating operation may not be performed in the second display region DA2. In other words, during the second period SS2, the user may recognize the difference in image quality between the first display region DA1 and the second display region DA2. However, according to the present disclosure, during the second period SS2, the first timing controller TCON1 may operate in the in-port mode, and the second timing controller TCON2 may operate in the out-port mode. Accordingly, the first timing controller TCON1 may not perform the compensating operation in the first display region DA1 during the second period SS2. During the third period SS3, the first timing controller TCON1 and the second timing controller TCON2 may perform compensating operation on the first display region DA1 and the second display region DA2, respectively, at the synchronization time point 't' at which both the first completion signal read_done1 and the second completion signal read_done2 are activated by the pull-up resistor circuit PRC. Accordingly, the electronic device 1000 can avoid a difference in image quality between the first display region DA1 and the second display region DA2. Accordingly, the electronic device 1000 having improved display quality may be provided.

Figure 9:
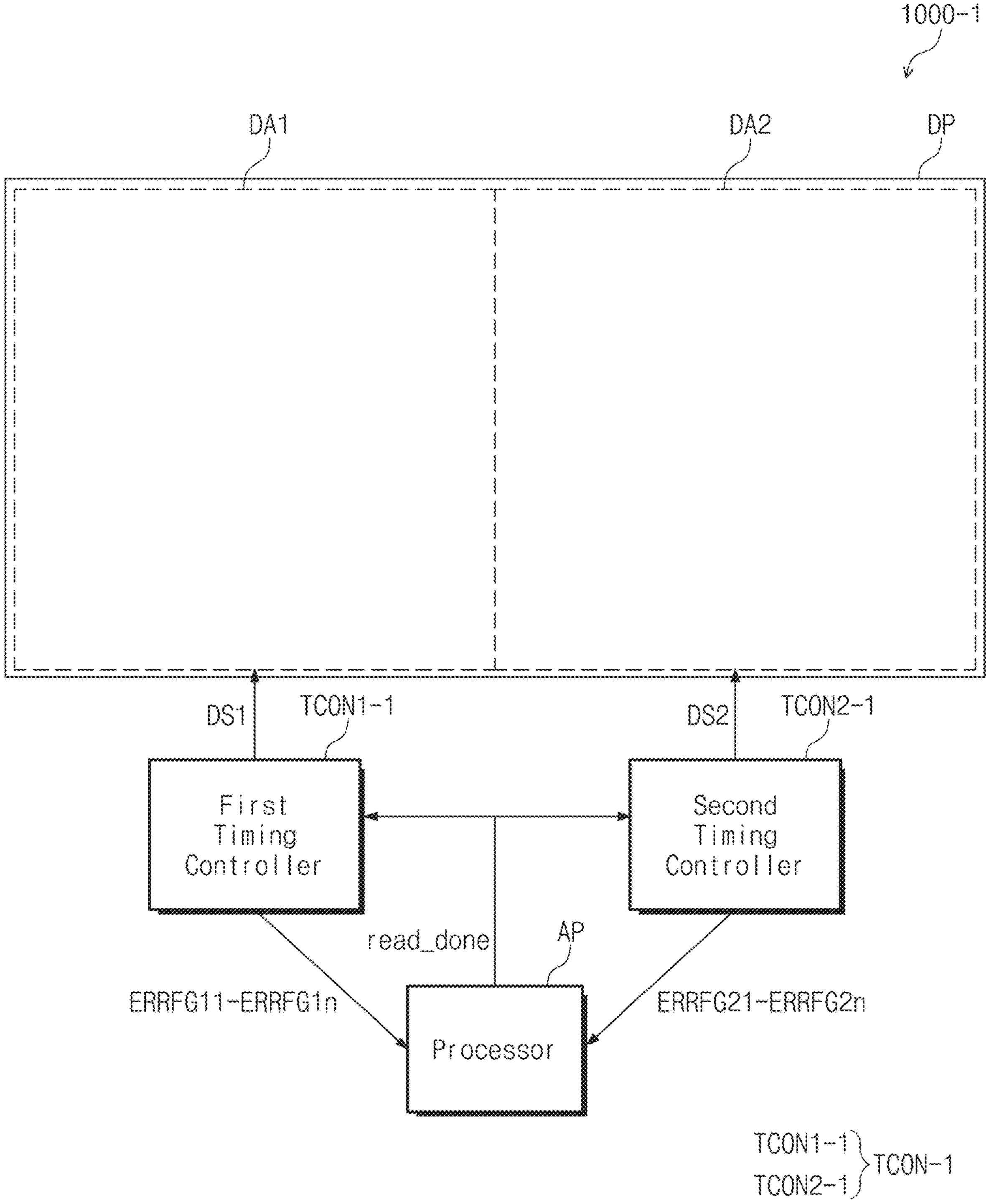
FIGS. 9 and 10 illustrate a display panel, a timing controller, and a processor according to an embodiment of the present disclosure.
Figure 10:
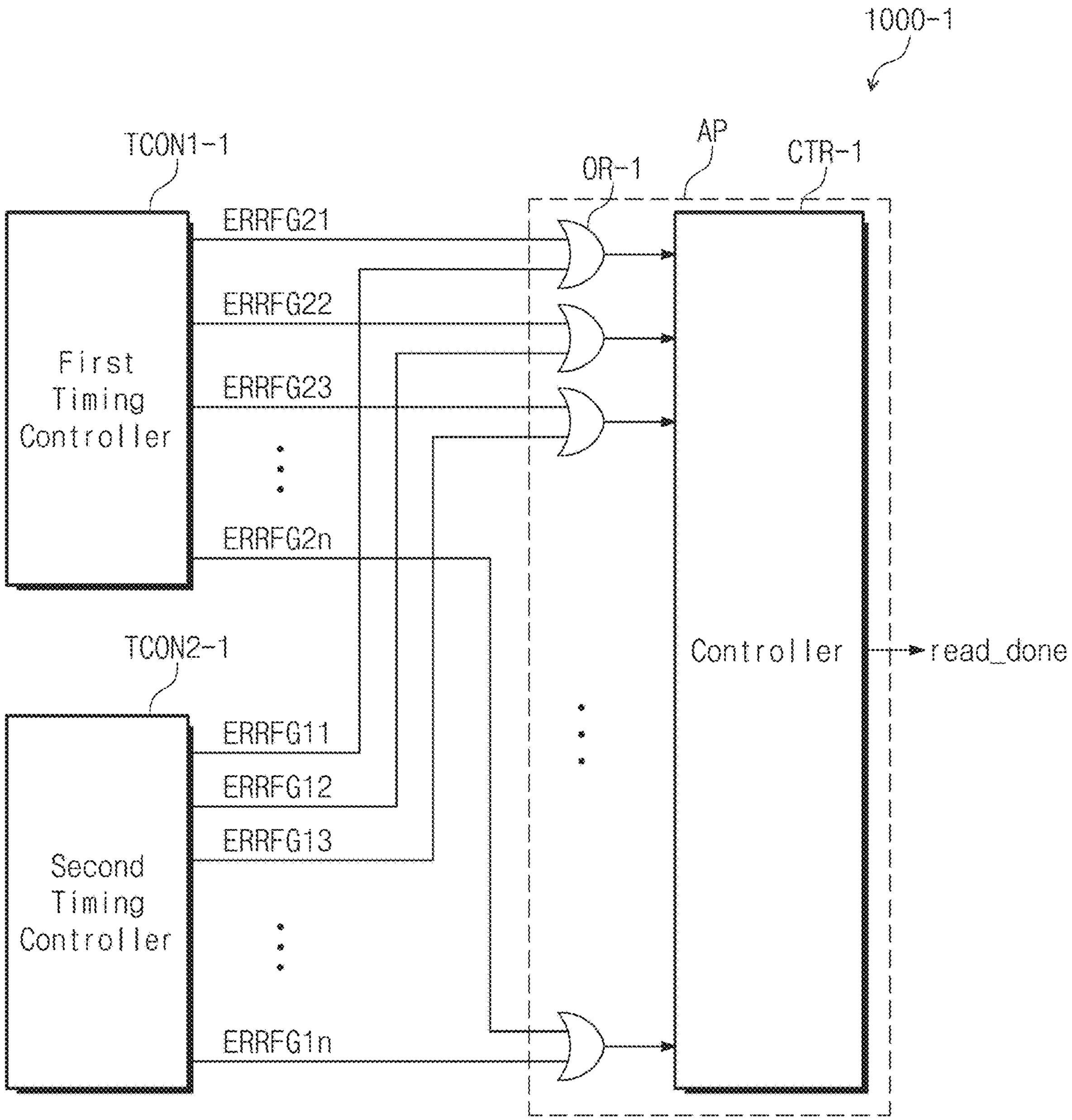

FIGS. 9 and 10 are block diagrams illustrating a display panel, a timing controller, and a processor according to an embodiment of the present disclosure. In the following description made with reference to FIG. 9, the same reference numerals are assigned to the same components described with reference to FIG. 4, and the details thereof will be omitted. In the following description made with reference to FIG. 10, the same reference numerals will be assigned to the same components described with reference to FIG. 5B, and the details thereof will be omitted.

Referring to FIGS. 9 and 10, an electronic device 1000-1 may include a display panel DP, a timing controller TCON-1, and a processor AP. The timing controller TCON-1 may include a plurality of timing controllers. For example, the plurality of timing controllers TCON-1 may include a first timing controller TCON1-1 and a second timing controller TCON2-1. The timing controller TCON-1 in other embodiments may include more than two timing controllers TCON1-1 and TCON2-1.

The first timing controller TCON1-1 may determine a first error state and generate the plurality of first error flag signals ERRFG11 to ERRFG1*n* indicating the first error state. Determining the first error state may include determining whether compensating data for performing a compensating operation is successfully loaded in the first timing controller TCON1-1. In other words, the first error state may be activated when the first timing controller TCON-1 is not performing the compensating operation for the first display region DA1. When the first error state is activated, one or more of the first error flag signals ERRFG11 to ERRFG1*n* may be activated. The first timing controller TCON1-1 may transmit the plurality of first error flag signals ERRFG11 to ERRFG1*n* to the processor AP.

The second timing controller TCON2-1 may determine a second error state and generate the plurality of second error flag signals ERRFG21 to ERRFG2*n* indicating the second error state. Determining the second error state may include determining whether compensating data for performing the compensating operation is loaded into the second timing controller TCON2-1. In other words, the second error state may be activated when the second timing controller TCON2-1 is not performing the compensating operation for the second display region DA2. When the second error state is activated, one or more of the second error flag signals ERRFG21 to ERRFG2*n* may be activated. The second timing controller TCON2-1 may transmit the plurality of second error flag signals ERRFG21 to ERRFG2*n* to the processor AP.

The first timing controller TCON1-1 may generate the first image data DS1 based on the input data RGB (see FIG.

3). The first timing controller TCON1-1 may drive the first display region DA1 based on the first image data DS1.

The second timing controller TCON2-1 may generate the second image data DS2 based on the input data RGB (see FIG. 3). The second timing controller TCON2-1 may drive the second display region DA2 based on the second image data DS2.

The processor AP may receive the plurality of first error flag signals ERRFG11 to ERRFG1*n* and the plurality of second error flag signals ERRFG21 to ERRFG2*n*. The processor AP may include a logic gate OR-1 and a controller CTR-1. A plurality of logic gates OR-1 may be provided in the processor AP, and each of the logic gates OR-1 may receive one of the first error flag signals ERRFG11 to ERRFG1*n* and one of the second error flag signals ERRFG21 to ERRFG2*n*. For example, a first logic gate among the plurality of logic gates OR-1 may receive the first-first error flag signal ERRFG11 and the second-first error flag signal ERRFG21.

The first logic gate OR-1 may output a first signal when at least one of the first-first error flag signal ERRFG11 and the second-first error flag signal ERRFG21 is activated. The first signal may be a high level. In other words, when an error occurs when the first timing controller TCON1-1 or the second timing controller TCON2-1 loads the compensating data of the display panel DP, the first signal may be output from the first logic gate OR-1.

When the first-first error flag signal ERRFG11 is deactivated and the second-first error flag signal ERRFG21 is deactivated, the first logic gate OR-1 may output a second signal different from the first signal. The second signal may be in a low level. In other words, when an error does not occur and when the compensating data of the display panel DP is loaded in each of the first timing controller TCON1-1 and the second timing controller TCON2-1, the second signal may be output by the first logic gate OR-1. Each of the other logic gates may operate in the same manner. In other words, each of the plurality of logic gate OR-1 may be a logical sum gate.

The controller CTR-1 may receive the first signals and/or the second signals from the plurality of logic gate OR-1. When receiving at least one first signal from the plurality of logic gates OR-1, the controller CTR-1 may deactivate the completion signal read_done and output the completion signal read_done having a deactivated state to the first timing controller TCON1-1 and the second timing controller TCON2-1. When receiving only the second signals from all logic gates OR-1, the controller CTR-1 may activate the completion signal read_done and output the completion signal read_done having an activated state to the first timing controller TCON1-1 and the second timing controller TCON2-1. The processor AP may thus output the completion signal read_done to the first timing controller TCON1-1 and the second timing controller TCON2-1, and the completion signal read_done may be activated when the compensating data are normally loaded into each of the timing controllers TCON-1.

When the first timing controller TCON1-1 and the second timing controller TCON2-1 receive the completion signal read_done, the first timing controller TCON1-1 and the second timing controller TCON2-1 may simultaneously drive the first display region DA1 and the second display region DA2 of the display panel DP. The first timing controller TCON1-1 may drive the first display region DA1 based on the first image data DS1 to which the compensating operation was applied. The second timing controller TCON2-1 may drive the second display region DA2 based on the second image data DS2 to which the compensating operation was applied.

The electronic device 1000-1 can avoid image degradation that might otherwise occur when a loading error of compensating data occurs in one of the first timing controller TCON1-1 and the second timing controller TCON2-1. In particular, image degradation may occur if the timing controller having no error performs the compensating operation to output image data, and the timing controller having the error outputs the image data without performing the compensating operation. For example, in such a case, the compensating operation may be performed in one of the first display region DA1 and the second display region DA2 but may not be performed in the remaining one of the first display region DA1 and the second display region DA2, and the user may recognize a difference in image quality between the first display region DA1 and the second display region DA2. However, according to the present disclosure, the first timing controller TCON1-1 and the second timing controller TCON2-1 detect a loading error of the compensating data to generate the plurality of first error flag signals ERRFG11 to ERRFG1*n* and the plurality of second error flag signals ERRFG21 to ERRFG2*n*, respectively, and transmit the plurality of first error flag signals ERRFG11 to ERRFG1*n* and the plurality of second error flag signals ERRFG21 to ERRFG2*n* to the processor AP. When at least one of the first error flag signal ERRFG11 to ERRFG1*n* and the second error flag signal ERRFG21 to ERRFG2*n* is activated, the processor AP may deactivate the completion signal read_done so the compensating operation may not be performed in the first display region DA1 and the second display region DA2. In other words, the compensating operation may be prevented from being performed only on one of the first display region DA1 and the second display region DA2. Therefore, the electronic device 1000-1 may provide improved display quality.

As described above, the first timing controller and the second timing controller may sense the loading error in compensating data, may generate the plurality of first error flag signals and the plurality of second error flag signals, respectively, and may exchange the plurality of first error flag signals and the plurality of second error signals with each other or with a shared processor. When at least one of the first error flag signal or the second error flag signal is activated, the first timing controller and the second timing controller may be prevented from performing the compensating operation on the first display region and the second display region. In other words, the compensating operation may be prevented from being performed on only one of the first display region and the second display region. Accordingly, an electronic device improved in display quality may be provided.

Although example embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a display panel including a first display region and a second display region adjacent to the first display region;

a first timing controller configured to drive the first display region; and a second timing controller configured to drive the second display region, wherein the first timing controller determines a first error state of the first display region and generates a first error flag signal indicating the first error state, wherein the second timing controller determines a second error state of the second display region and generates a second error flag signal indicating the second error state, wherein the first timing controller and the second timing controller exchange the first error flag signal and the second error flag signal with each other, wherein the first timing controller deactivates a first completion signal when at least one of the first error flag signal and the second error flag signal is activated, wherein the second timing controller deactivates a second completion signal when at least one of the second error flag signal and the first error flag signal is activated, and wherein the first timing controller and the second timing controller drive the first display region and the second display region of the display panel, respectively when the first completion signal is activated and the second completion signal is activated.

2. The electronic device of claim 1, wherein the first timing controller comprises:

a first correcting unit configured to store the first error flag signal;

a first memory unit configured to store the second error flag signal;

a logic gate which receives the first error flag signal and the second error flag signal; and a controller configured to receive a first signal or a second signal from the logic gate and activate or deactivate the first completion signal based on the first signal or the second signal.

3. The electronic device of claim 2, wherein the logic gate outputs the first signal when at least one of the first error flag signal and the second error flag signal is activated.

4. The electronic device of claim 3, wherein the logic gate outputs the second signal different from the first signal when the first error flag signal is deactivated and the second error flag signal is deactivated.

5. The electronic device of claim 4, wherein the controller activates the first completion signal in response to the second signal.

6. The electronic device of claim 1, wherein the first timing controller is configured to operate in an out-port mode to output the first completion signal having a low level when the first completion signal is deactivated.

7. The electronic device of claim 1, wherein the first timing controller is configured to:

operate in an in-port mode when the first completion signal is activated, wherein the second timing controller is configured to operate in an out-port mode to output the second completion signal having a low level when the second completion signal is deactivated, and wherein the first timing controller is configured to receive the second completion signal having the low level.

8. The electronic device of claim 1, further comprising:

a pull-up resistor circuit applying a driving signal having a high level to the first timing controller and the second timing controller.

9. The electronic device of claim 8, wherein the first timing controller is configured to operate in an in-port mode to receive the driving signal and the second timing controller operates in the in-port mode to receive the driving signal when the first completion signal is activated and the second completion signal is activated, and wherein the first timing controller and the second timing controller simultaneously drive the first display region and the second display region of the display panel when receiving the driving signal.

10. The electronic device of claim 1, wherein the first timing controller is configured to perform a compensating operation on the first display region, and wherein the first error state is activated when the compensating operation is not performed.

11. The electronic device of claim 10, wherein the first timing controller is configured to perform a checksum operation on data required for the compensating operation and to generate the first error flag signal based on results of the checksum operation.

12. An electronic device comprising:

a display panel including a first display region and a second display region adjacent to the first display region;

a first timing controller configured to drive the first display region;

a second timing controller configured to drive the second display region; and a processor configured to drive the first timing controller and the second timing controller, wherein the first timing controller determines a first error state of the first display region and generates a first error flag signal indicating the first error state, wherein the second timing controller determines a second error state of the second display region and generates a second error flag signal indicating the second error state, wherein the first timing controller and the second timing controller provide the first error flag signal and the second error flag signal to the processor, wherein the processor is configured to:

deactivate a completion signal when at least one of the first error flag signal and the second error flag signal is activated, and wherein the processor is configured to drive the first display region and the second display region of the display panel, respectively, when the completion signal is activated.

13. The electronic device of claim 12, wherein the processor comprises:

a logic gate which receives the first error flag signal and the second error flag signal; and a controller configured to receive a first signal or a second signal from the logic gate and to activate or deactivate the completion signal based on the first signal or the second signal.

14. The electronic device of claim 13, wherein the logic gate is a logical sum gate.

15. The electronic device of claim 13, wherein the logic gate outputs the first signal when at least one of the first error flag signal and the second error flag signal is activated.

16. The electronic device of claim 15, wherein the logic gate outputs the second signal different from the first signal when the first error flag signal is deactivated and the second error flag signal is deactivated.

17. The electronic device of claim 16, wherein the controller activates the completion signal when receiving the second signal.

18. The electronic device of claim 12, wherein the processor is configured to:

output the completion signal activated by the first timing controller and the second timing controller, and wherein the first timing controller and the second timing controller simultaneously drive the first display region and the second display region of the display panel when receiving the completion signal.

19. The electronic device of claim 12, wherein the first timing controller is configured to perform a compensating operation on the first display region, and wherein the first error state is activated when the compensating operation is not performed.

20. The electronic device of claim 19, wherein the first timing controller is configured to perform the compensating operation through a checksum and generate the first error flag signal.

* * * * *